United States Patent
Spingler

(10) Patent No.: US 7,109,614 B2
(45) Date of Patent: Sep. 19, 2006

(54) DRIVE UNIT FOR DETERMINING A ROTATION POSITION AND/OR ROTATION SPEED OF A DRIVE SHAFT

(75) Inventor: Michael Spingler, Herzogenaurach (DE)

(73) Assignee: Siemens Aktiengesellschaft, München (DE)

( * ) Notice: Subject to any disclaimer, the term of this patent is extended or adjusted under 35 U.S.C. 154(b) by 85 days.

(21) Appl. No.: 10/425,998

(22) Filed: Apr. 29, 2003

(65) Prior Publication Data

US 2004/0027117 A1    Feb. 12, 2004

(30) Foreign Application Priority Data

Apr. 29, 2002  (DE) ................. 102 19 090
Oct. 18, 2002  (DE) ................. 102 48 772

(51) Int. Cl.
H02K 7/08   (2006.01)
H02K 29/10  (2006.01)

(52) U.S. Cl. ............... 310/68 B; 310/90; 250/231.13
(58) Field of Classification Search ............. 310/90, 310/68 B; 384/448; 324/207.25; 250/231, 250/13–16

See application file for complete search history.

(56) References Cited

U.S. PATENT DOCUMENTS

| | | | | |
|---|---|---|---|---|
| 3,714,448 A | * | 1/1973 | Cronan | 250/231.14 |
| 4,866,269 A | * | 9/1989 | Wlodarczyk et al. | 250/231.18 |
| 5,126,560 A | * | 6/1992 | Kraus | 250/231.13 |
| 5,155,401 A | * | 10/1992 | Kanaya et al. | 310/89 |
| 5,160,865 A | * | 11/1992 | Gururangan | 310/67 R |
| 5,241,172 A | * | 8/1993 | Lugaresi | 250/231.16 |
| 5,528,095 A | * | 6/1996 | Strobl | 310/156.12 |
| 5,537,874 A | * | 7/1996 | Akahane et al. | 73/514.04 |
| 5,689,994 A | * | 11/1997 | Nagai et al. | 74/89.32 |
| 5,696,445 A | * | 12/1997 | Inbar | 324/228 |
| 6,021,296 A | * | 2/2000 | Tamura et al. | 399/277 |
| 6,194,708 B1 | * | 2/2001 | Wang et al. | 250/231.13 |
| 6,462,450 B1 | * | 10/2002 | Haussecker et al. | 310/156.09 |
| 6,563,109 B1 | * | 5/2003 | Kosters | 250/237 G |
| 6,703,602 B1 | * | 3/2004 | Hao | 250/231.18 |
| 2002/0153794 A1 | * | 10/2002 | Kawasaki et al. | 310/156.08 |
| 2003/0091253 A1 | * | 5/2003 | Morita et al. | 384/448 |

FOREIGN PATENT DOCUMENTS

| | | |
|---|---|---|
| DE | 296 22 996 U1 | 11/1997 |
| DE | 298 12 803 U1 | 10/1998 |
| DE | 197 42 800 C1 | 9/1999 |
| DE | 102 19090 | * 11/2004 |

* cited by examiner

Primary Examiner—Karl Tamai
(74) Attorney, Agent, or Firm—Henry M. Feiereisen

(57) ABSTRACT

A drive unit includes a housing and a drive shaft, in particular a spindle. The housing has a bearing which rotatably supports the drive shaft which is axially braced with the bearing by means of a clamping element. A measuring indication is arranged on the clamping element and is scanned by a sensing element.

30 Claims, 4 Drawing Sheets

DRIVE UNIT FOR DETERMINING A ROTATION POSITION AND/OR ROTATION SPEED OF A DRIVE SHAFT

CROSS-REFERENCES TO RELATED APPLICATIONS

This application claims the priority of German Patent Applications, Serial Nos. 102 19 090.9, filed Apr. 29, 2002, and 102 48 772.3, filed Oct. 18, 2002, pursuant to 35 U.S.C. 119(a)–(d), the disclosure of which is incorporated herein by reference.

BACKGROUND OF THE INVENTION

The present invention relates, in general, to a drive unit.

Conventional drive units typically include a housing with a bearing and a drive shaft, with the drive shaft rotatably supported in the bearing. The rotation position and/or the rotation speed of the drive shaft of the drive unit can be determined by a combination of a sensing element and a measuring indication. The measuring indication is typically arranged on a measuring wheel which is pushed over on the drive shaft, whereby the measuring indication is restrained against rotation and against axial movement relative to the drive shaft by a clamping element. German utility model DE 298 12 803 U1 discloses a measuring indication for a shaft encoder, which can be connected directly with a (hollow) drive shaft via a hub.

For a number of reasons, the various proposals are endowed with drawbacks and shortcomings relating for example to manufacturing techniques and complexity of construction.

It would therefore be desirable and advantageous to provide an improved drive unit, which obviates prior art shortcomings and is simple in structure.

SUMMARY OF THE INVENTION

According to one aspect of the present invention, a drive unit includes a housing, a bearing unit disposed in the housing, a drive shaft accommodated in the housing and rotatably supported by the bearing unit, a clamping element for bracing the drive shaft with the bearing unit in axial direction, a measuring indication disposed on the clamping element, and a sensing element arranged on the housing for scanning the measuring indication.

The present invention resolves prior art problems by arranging the measuring indication on the clamping element itself, so that the clamping element not only assumes clamping function, but also serves as carrier for the measuring indication.

According to another feature of the present invention, the clamping element may be constructed either as a thrust ring or as a shaft nut. The measuring indication may be implemented as optical measuring indication or also as magnetic measuring indication. When made of plastic, the measuring indication is easy to manufacture and mechanically stable. Examples of plastics include elastomers, in particular magnetizable elastomers Suitably, the measuring indication is applied to the clamping element by a spraying technique.

According to another embodiment of the present invention, the clamping element and the measuring indication can be easily manufactured by making the clamping element of a base element and a support element, which are connected to one another either in a form-fitting manner or through forced engagement, by bracing the drive shaft via the base element with the bearing unit, and by arranging the measuring indication on the support element. Suitably, the measuring indication can hereby be placed on the support element before the support element is connected with the base element.

According to another feature of the present invention, the support element may have a ring-shaped configuration to encircle the base element, thereby establishing a particularly stable connection between the base element and the support element. This is true in particular, when the support element is shrunk or compressed onto the base element. The support element may simply be formed as a strip. However, a greater stability can be realized, when the support element is configured as a closed U-shaped profile or as a closed double-T-shaped profile.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
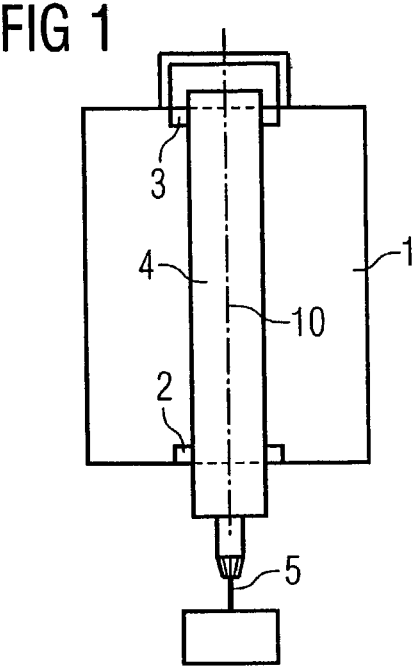
FIG. 1 is a general schematic illustration of a drive unit, having incorporated therein the subject matter of the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a general schematic illustration of a drive unit incorporating the subject matter of the present invention according to the invention, e.g., for use in machine tool. It will be appreciated by persons skilled in the art that the drive must contain much mechanical apparatus which does not appear in the foregoing Figures. However, this apparatus is not part of the invention and has been omitted from the Figures for the sake of simplicity. The drive unit includes an electric motor having a housing 1 with a front bearing 2 and a rear bearing 3, and a drive shaft 4, which is rotatably supported by the bearings 2, 3 at the respective ends thereof. The drive shaft 4 may be configured as a spindle and has a forward end to support a tool 5, for example a drill bit 5. The bearings 2, 3 may, as indicated e.g. in FIG. 2, configured as rolling-contact bearings.

Figure 2:
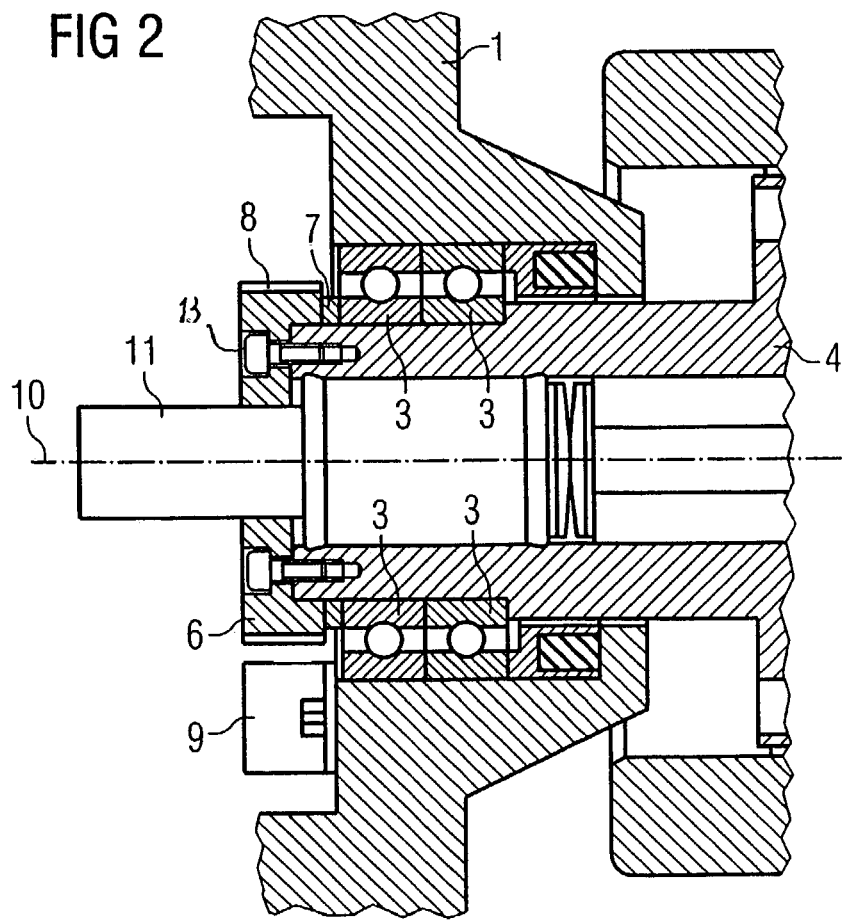
FIG. 2 is a detailed sectional view, on an enlarged scale, of a rear portion of the drive unit including a clamping element in the form of a thrust ring.

As shown in FIG. 2, which is a sectional view, on an enlarged scale, of a rear portion of the drive unit, the drive shaft 4 is hollow and receives, for example, a tool chuck 11 to accommodate and clamp the tool 5. The drive shaft 4 is axially braced with the rear bearing 3 by a clamping element 6 and a spacer ring 7. The clamping element 6 depicted in FIG. 2 is implemented as a thrust ring 6 which is secured to the drive shaft 4 by screw fasteners 13.

Arranged on the clamping element 6 is a measuring indication 8, for example a magnetic measuring indication or an optical measuring indication. In a magnetic measuring indication, segments may be magnetized in different magnetic directions, such as alternating N-S poles, whereas an optical measuring indication may includes segments of different reflectivity and/or color. A sensing element 9 is arranged on the housing 1 and scans the measuring indication 8 to generate a measuring signal based on which a rotation position and/or a rotation speed of the drive shaft 4 about a drive shaft axis 10 can be determined.

Figure 3:
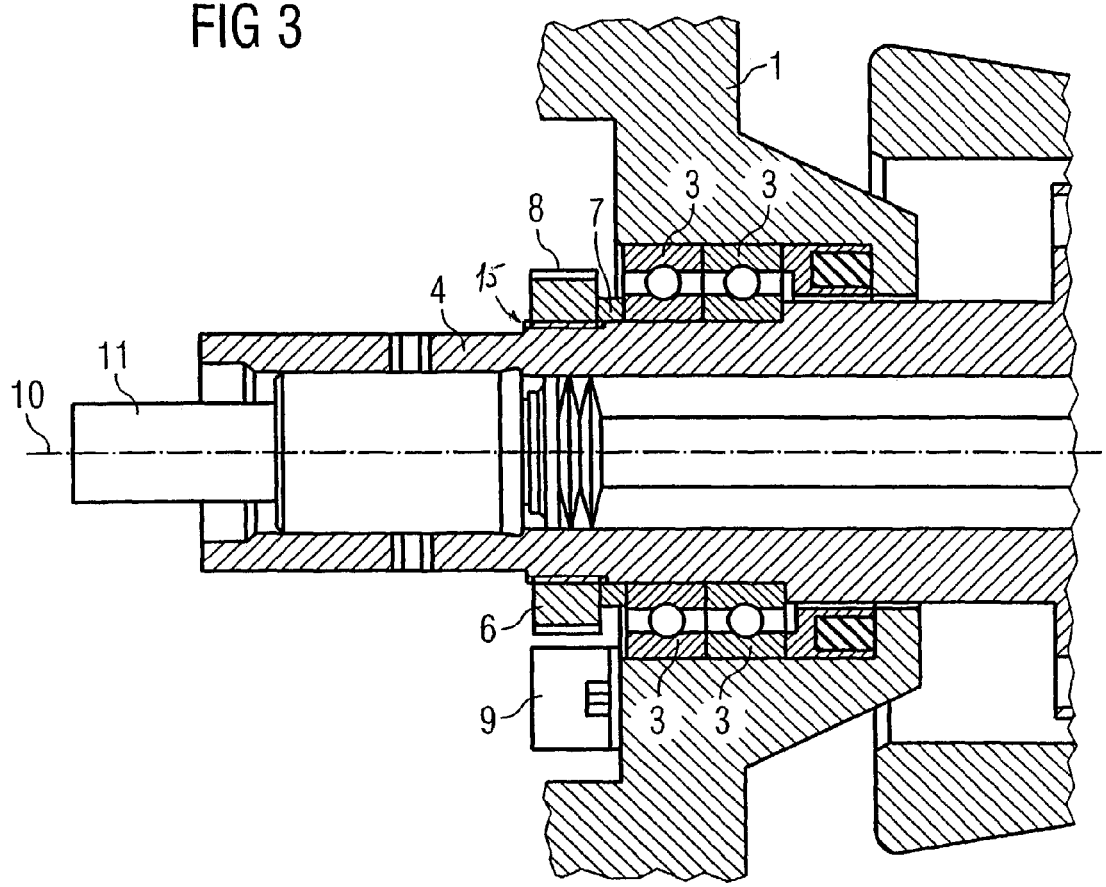
FIG. 3 is a detailed sectional view, on an enlarged scale, of the rear portion of the drive unit including a clamping element in the form of a nut.

Referring now to FIG. 3, there is shown a sectional view, on an enlarged scale, of the rear portion of the drive unit, similar to the illustration of the drive unit of FIG. 2. Parts corresponding with those in FIG. 2 are denoted by identical reference numerals and not explained again. In this embodiment, provision is made for a clamping element 6 in the form of a nut 6 instead of a thrust ring. The description below will center only on the differences between the embodiments. As shown in FIG. 3, the clamping element 6 is formed with an internal thread for threaded engagement, indicated in general by reference numeral 15, with an external thread along a section of the drive shaft 4.

Figure 4:
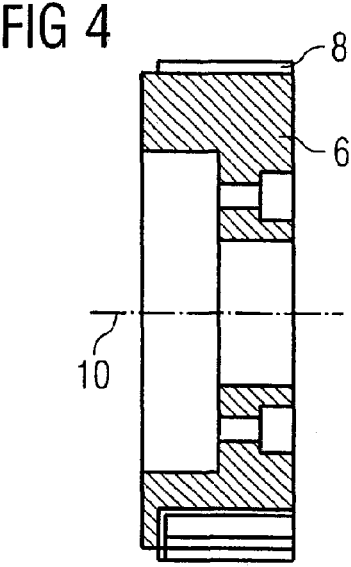
FIG. 4 is a side sectional view of a modification of a clamping element of FIG. 2.
Figure 5:
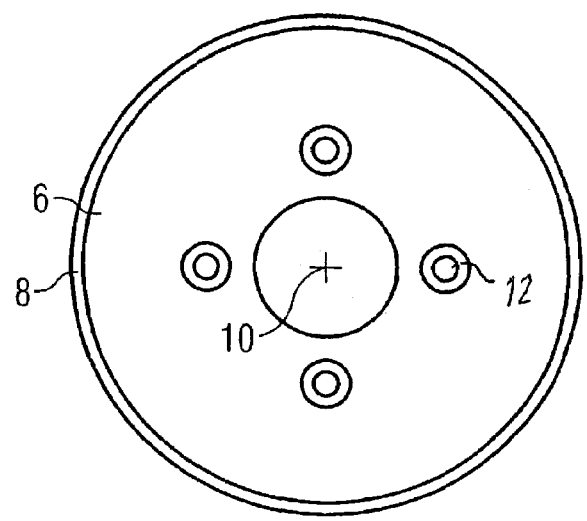
FIG. 5 is a frontal view of the clamping element of FIG. 4.

Turning now to FIG. 4, there is shown a detailed side sectional view of a modified clamping element 6. The clamping element 6 is made of steel, whereas the measuring indication 8, disposed on the clamping element 6, is made here preferably of plastic. A particularly stable connection between the clamping element 6 and the measuring indication 8 can be realized, for example, by spraying the measuring indication 8 onto the clamping element 6. This is especially true, when the plastic is an elastomer, or a magnetic elastomer, when the measuring indication 8 is of a magnetic type. As shown in particular in FIG. 5, the clamping element 6 has four boreholes 12 in uniform spaced-apart relationship about the axis 10 for receiving screw fasteners 13 (FIG. 2) to mount the clamping element 6 to the drive shaft 4.

Unlike the clamping element 6 of FIG. 4, which is made as a single piece, FIGS. 6 to 12 relate to a clamping element which is comprised of two elements, namely a base element 6' and a support element 6", which are both made preferably of steel. The drive shaft 4 is braced with the rear bearing 3 by means of the base element 6', while the support element 6" is connected with the base element 6' in a form-fitting manner or through forced engagement. As shown in particular in FIGS. 7 and 10, the support element 6" has a ring-shaped configuration and encircles the base element 6'. A particularly stable construction is realized, when the support element 6" is compressed or shrunk onto the base element 6'.

As depicted in FIGS. 6 to 12, the measuring indication 8 is disposed on the support element 6", and may be made of plastic, for example an elastomer or a magnetizable elastomer, when the measuring indication 8 is of the magnetic kind. Suitably, the measuring indication 8 may be sprayed onto the support element 6".

Figure 6:
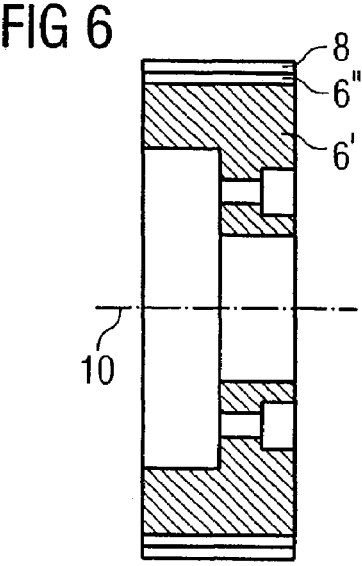
FIG. 6 is a side view of still another variation of a clamping element.
Figure 7:
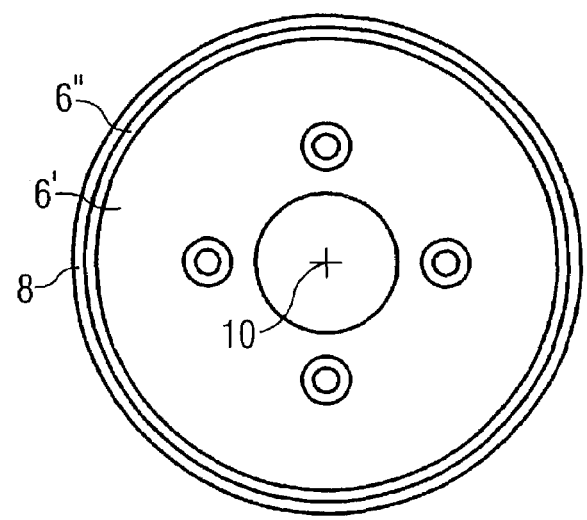
FIG. 7 is a frontal view of the clamping element of FIG. 6.
Figure 8:
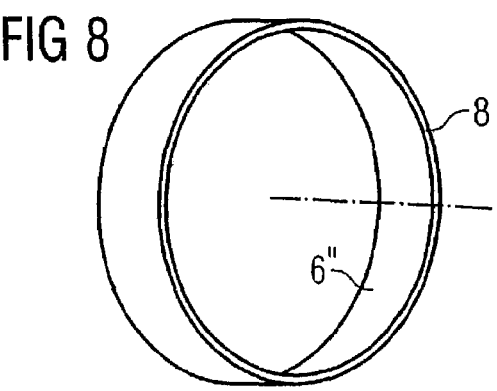
FIG. 8 is a side perspective view of a support element of the clamping element of FIG. 6.
Figure 9:
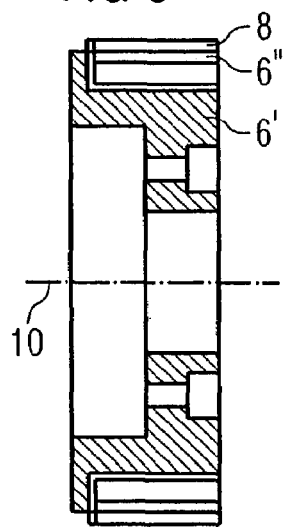
FIG. 9 is a side view of still another variation of a clamping element.
Figure 10:
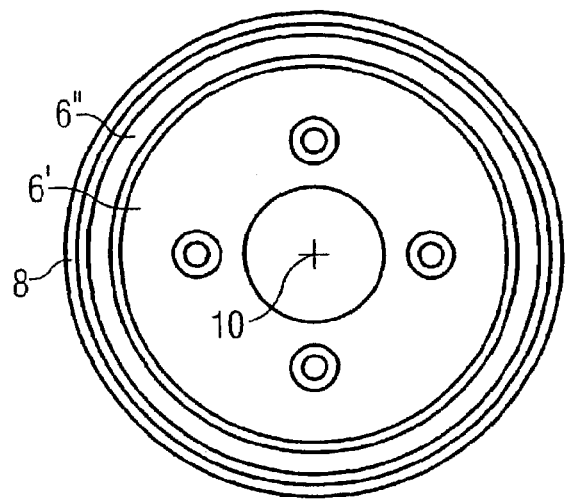
FIG. 10 is a frontal view of the clamping element of FIG. 9.
Figure 11:
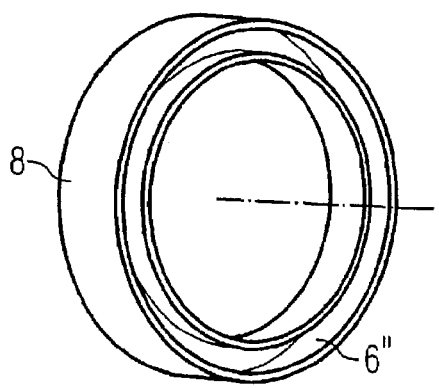
FIG. 11 is a side perspective view of another variation of a support element.
Figure 12:
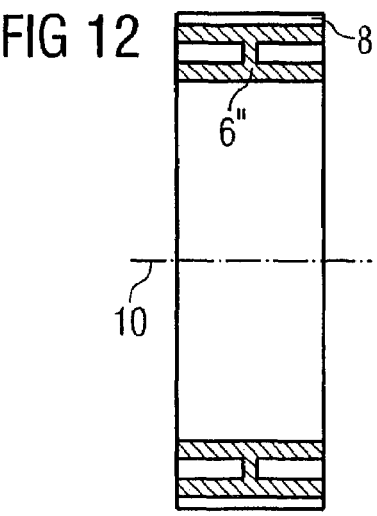
FIG. 12 is a sectional view of still another variation of a support element.

According to the illustration of FIGS. 6 to 8, the support element 6" is configured as a simple strip 6", while the illustration of FIGS. 9 to 11 shows an embodiment of the support element 6" in the form of a closed U-shaped profile. A U-shaped profile of the support element 6" provides more stability, although this may complicate the manufacturing process. In the embodiment if FIG. 12, the support element 6" has a closed double-T-shaped profile 6" which affords even greater stability than the U-profile, although manufacture may become even more complicated.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A drive unit comprising:
    a housing defining an axis;
    a bearing unit disposed in the housing;
    a drive shaft accommodated in the housing and rotatably supported by the bearing unit;
    a clamping element having a base element for bracing the drive shaft with the bearing unit in axial direction and a support element which is made of steel and connected with the base element, wherein the support element is configured as a strip;
    an optical measuring indication made of plastic and secured on the support element; and
    a sensing element arranged on the housing for scanning the measuring indication.

2. The drive unit of claim 1, wherein the drive shaft is a spindle.

3. The drive unit of claim 1, wherein the measuring indication is sprayed onto the clamping element.

4. The drive unit of claim 1, wherein the plastic is an elastomer.

5. The drive unit of claim 1, wherein the drive shaft is constructed as hollow drive shaft.

6. The drive unit of claim 1, wherein the base element and the support element are connected in a form-fitting manner.

7. The drive unit of claim 1, wherein the base element and the support element are connected through a forced engagement.

8. The drive unit of claim 1, wherein the support element is shrunk onto the base element.

9. The drive unit of claim 1, wherein the measuring indication extends on the support element in parallel relationship to the drive shaft.

10. The drive unit of claim 1, wherein the measuring indication extends at an outer periphery of the support element to encircle the support element.

11. A drive unit comprising:
    a housing defining an axis;
    a bearing unit disposed in the housing;

a drive shaft accommodated in the housing and rotatably supported by the bearing unit;

a clamping element having a base element for bracing the drive shaft with the bearing unit in axial direction and a support element which is made of steel and connected with the base element, wherein the support element is configured as a closed U-shaped profile;

an optical measuring indication made of plastic and secured on the support element; and a sensing element arranged on the housing for scanning the measuring indication.

12. The drive unit of claim 11, wherein the drive shaft is a spindle.

13. The drive unit of claim 11, wherein the measuring indication is sprayed onto the clamping element.

14. The drive unit of claim 11, wherein the plastic is an elastomer.

15. The drive unit of claim 11, wherein the drive shaft is constructed as hollow drive shaft.

16. The drive unit of claim 11, wherein the base element and the support element are connected in a form-fitting manner.

17. The drive unit of claim 11, wherein the base element and the support element are connected through a forced engagement.

18. The drive unit of claim 11, wherein the support element is shrunk onto the base element.

19. The drive unit of claim 11, wherein the measuring indication extends on the support element in parallel relationship to the drive shaft.

20. The drive unit of claim 11, wherein the measuring indication extends at an outer periphery of the support element to encircle the support element.

21. A drive unit comprising:
a housing defining an axis;
a bearing unit disposed in the housing;
a drive shaft accommodated in the housing and rotatably supported by the bearing unit;

a clamping element having a base element for bracing the drive shaft with the bearing unit in axial direction and a support element which is made of steel and connected with the base element, wherein the support element is configured as a closed double-T-shaped profile;

an optical measuring indication made of plastic and secured on the support element; and a sensing element arranged on the housing for scanning the measuring indication.

22. The drive unit of claim 21, wherein the drive shaft is a spindle.

23. The drive unit of claim 21, wherein the measuring indication is sprayed onto the clamping element.

24. The drive unit of claim 21, wherein the plastic is an elastomer.

25. The drive unit of claim 21, wherein the drive shaft is constructed as hollow drive shaft.

26. The drive unit of claim 21, wherein the base element and the support element are connected in a form-fitting manner.

27. The drive unit of claim 21, wherein the base element and the support element are connected through a forced engagement.

28. The drive unit of claim 21, wherein the support element is shrunk onto the base element.

29. The drive unit of claim 21, wherein the measuring indication extends on the support element in parallel relationship to the drive shaft.

30. The drive unit of claim 21, wherein the measuring indication extends at an outer periphery of the support element to encircle the support element.

* * * * *